United States Patent [19]

Rancer

[11] Patent Number: 4,561,177
[45] Date of Patent: Dec. 31, 1985

[54] APPARATUS FOR FRAMING FABRIC IN EMBROIDERY HOOPS

[76] Inventor: Karl E. Rancer, Rte. 2, Box 310A, Stokesdale, N.C. 27357

[21] Appl. No.: 650,432

[22] Filed: Sep. 14, 1984

[51] Int. Cl.[4] .................. B23P 21/00; B23Q 15/00
[52] U.S. Cl. ........................... 29/721; 29/238; 29/407; 29/448; 29/559; 38/102.2; 269/307
[58] Field of Search ............... 29/701, 721, 448, 559, 29/235, 238, 267, 407; 38/102.2; 112/78, 236; 269/307

[56] References Cited

U.S. PATENT DOCUMENTS

| | | | |
|---|---|---|---|
| 662,982 | 12/1900 | Stevens | 269/307 X |
| 1,294,713 | 2/1919 | Runnette | 269/307 X |
| 2,190,582 | 2/1940 | Wolf | 29/407 UX |
| 2,362,185 | 11/1944 | Brammer | 29/267 X |
| 2,533,870 | 12/1950 | Bayer | 29/267 X |
| 2,753,897 | 7/1956 | Conrad | 29/238 X |
| 3,099,875 | 8/1963 | Lelis | 29/267 X |
| 3,608,179 | 9/1971 | Jeffree et al. | 29/238 X |
| 3,705,454 | 12/1972 | Zuhlke | 29/238 X |
| 3,871,055 | 3/1975 | Dail | 29/267 |
| 3,874,058 | 4/1975 | Jesevich et al. | 29/238 X |

Primary Examiner—Charlie T. Moon
Attorney, Agent, or Firm—Charles R. Rhodes; Judith E. Garmon

[57] ABSTRACT

An apparatus for inserting sheet material or textile fabric between the mating male and female rings of an embroidery hoop. The female ring is placed in a cutout in a support plate or template and the fabric to be embroidered is positioned thereover. The corresponding male ring carried by a reciprocating head is then activated to insert the male ring into the female ring with the fabric therebetween completing the assembly.

8 Claims, 4 Drawing Figures

APPARATUS FOR FRAMING FABRIC IN EMBROIDERY HOOPS

BACKGROUND AND SUMMARY OF PRESENT INVENTION

In the use of multiple-head embroidery machines there has been no really efficient means for framing fabrics or material in the hoops at a speed adequate to supply the machine. Consequently the practice has generally been to complete the manual framing operation before starting the machine, or have one person manually perform the framing operation while another operates the embroidery machine.

In addition to being slow, manual framing operations are sometimes tedious in that proper alignment of the material within the hoop is difficult to achieve because only one hand is free to manipulate or control the material while the other inserts the male ring of the hoop. After the material is framed, it is then pulled and adjusted to properly align. If not properly framed the resulting pattern may be out of alignment and useless in a finished product.

It was to overcoming these problems, by the provision of a machine for framing fabric or materials in embroidery hoops, that the present inventor turned. The present invention, in its preferred embodiment, is an apparatus or machine having components for receiving the respective male and female rings of an embroidery hoop, holding the rings in a stationary position while fabric is aligned over the female ring, then inserting the male ring into the female ring, securing the material therebetween. Further, other approaches are envisioned where the female ring and fabric piece are positioned and mechanically held stationary with respect to each other while the male ring is manually emplaced.

Only one person is required to operate the machine of the present invention, and it has been found that the time to complete a conventional framing operation has been reduced by thirty to fifty percent. In tests performed during development of the machine, it was determined that one person can perform the framing operation for a conventional multi-head embroidery machine and simultaneously operate the embroidery machine. Such capacity substantially reduces the cost of an embroidering operation in terms of time and personnel.

More specifically, the machine of the present invention, which is compact and requires relatively little space in a manufacturing facility, is of a simple mechanical design having a minimum of interrelated working components, and requires no input of electrical energy. The sole energy input to operate the machine comes from the operator, with the motion required to run the machine being minimal and very efficient.

Toward this end the operative components are mounted on a substantially vertical supporting frame, of relatively narrow proportions. The vertical frame supports a vertically adjustable, horizontally extending table and template unit which receives the female ring of the embroidery hoop in a relatively stationary position. Mounted above the support table is a vertically reciprocating insertion means in the form of a head that is activated to insert the male ring into the female ring. The reciprocating head includes a circular retaining portion around which the male ring is frictionally held before insertion into the female ring. The head is mounted above the support table such that the male and female rings are aligned along a common axis through the approximate center of each ring. An activating means, preferably in the form of a reciprocating linkage, connects a foot pedal to the reciprocating head for the operation thereof.

After the female ring is positioned within the template, as will be described in detail below, the fabric or other material is positioned thereacross, and the foot pedal is depressed to activate the linkage to lower the head and insert the male ring therein. When the control pedal is released, the head is raised to a normal upward position to receive subsequent male rings therearound. The process is fast and required human energy input is minimal. It is thus seen that the primary objective of providing a machine for efficiently and accurately framing fabrics in embroidery hoops is realized. Other and further objectives will be recognized by those skilled in the art as the following detailed description is studied in conjunction with the accompanying drawings. In the drawings:

DETAILED DESCRIPTION OF A PREFERRED EMBODIMENT

Figure 1:
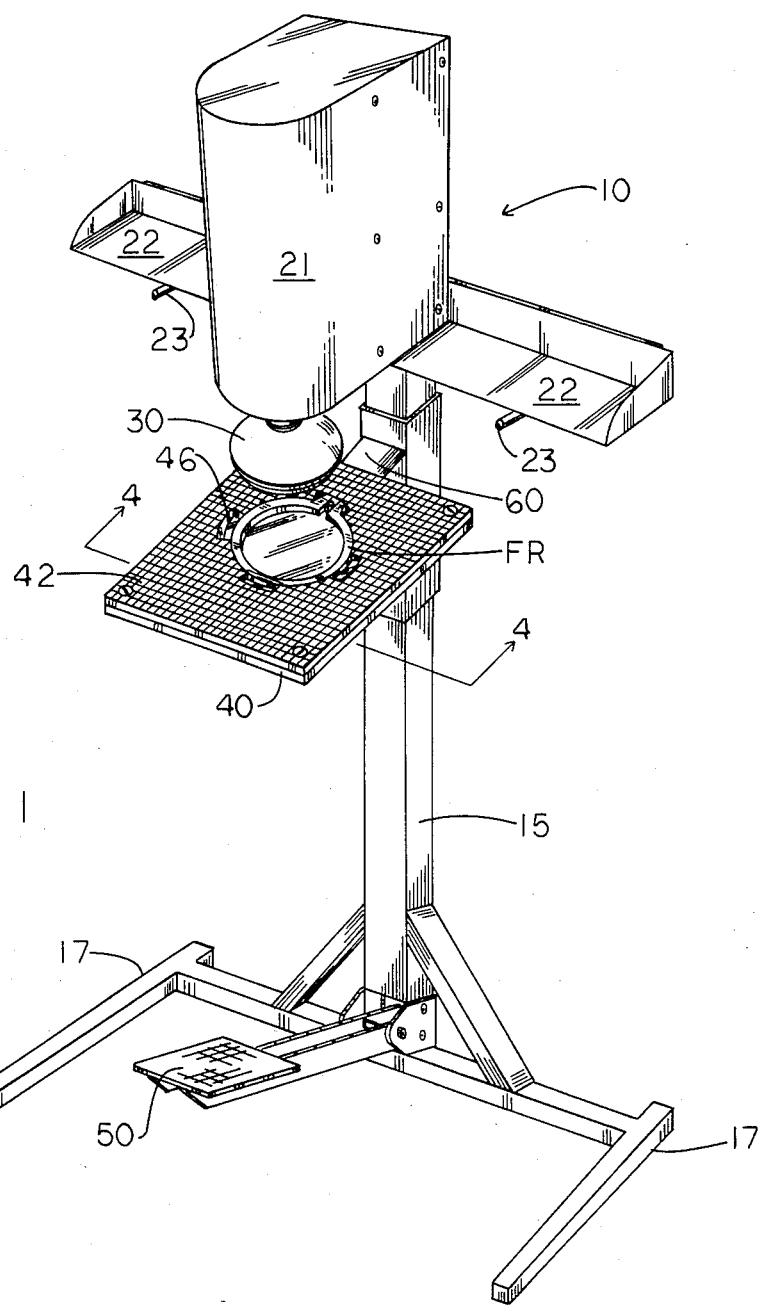
FIG. 1 is a perspective view of the apparatus according to a preferred embodiment.
Figure 2:
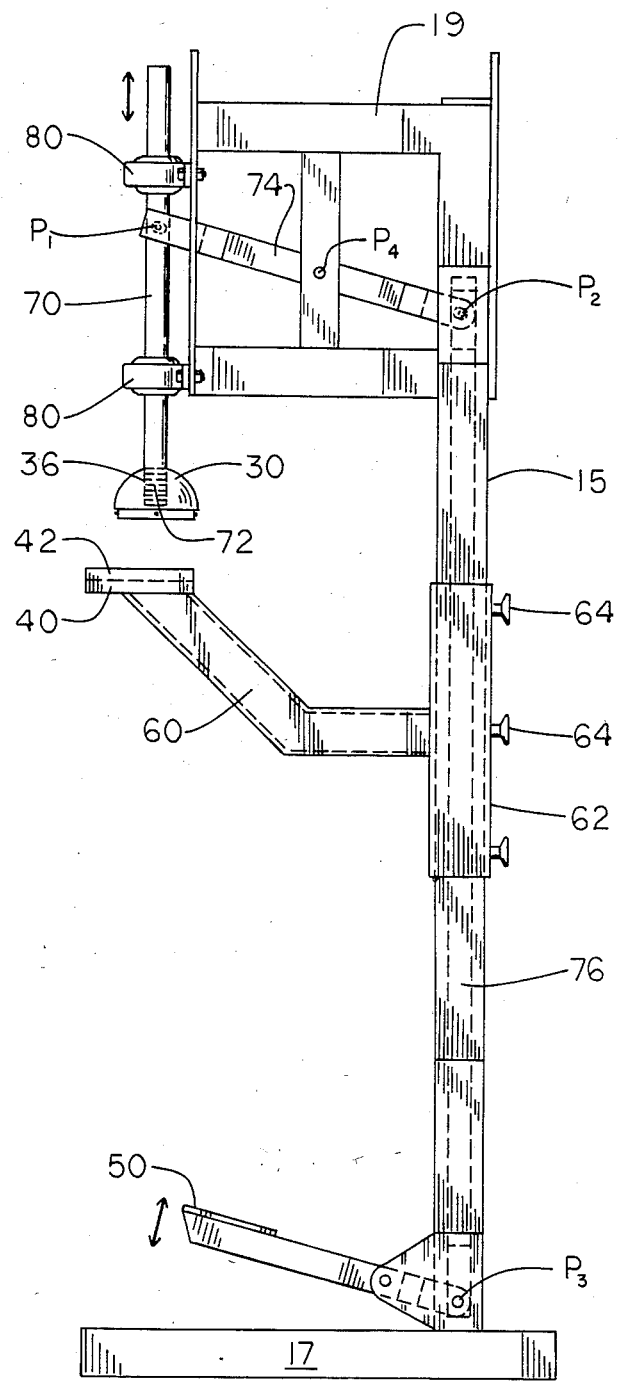
FIG. 2 is a detailed schematic taken from a side view of the embodiment of FIG. 1.

Looking first at FIG. 1 the framing machine 10 of the present invention, which includes in its broadest aspect a relatively stationary support plate or member 40, an insertion means in the form of a reciprocating head 30, and an activation means (shown as components 50, 76, 74 and 70 in FIG. 2). The aforesaid elements are mounted on a substantially vertical support 15, a pair of feet 17 forming a base, and an upper horizontal bracket 19 upon which the reciprocating head 30 is mounted. The bracket 19 is best illustrated in FIG. 2, because it is concealed within the housing 21 of FIG. 1. The housing 21 is provided to protect the working portion of the reciprocating head from dust and debris and, more importantly, to protect the operator from the working components of the machine.

Also shown in FIG. 1 are the vertically reciprocating head 30, the template support table 40, an overlying template 42, and an activating foot pedal 50. Accessories or functional support components are a set of shelves 22 and empty embroidery hoop spindles 23 which can be removed if space becomes a consideration.

Figure 3:
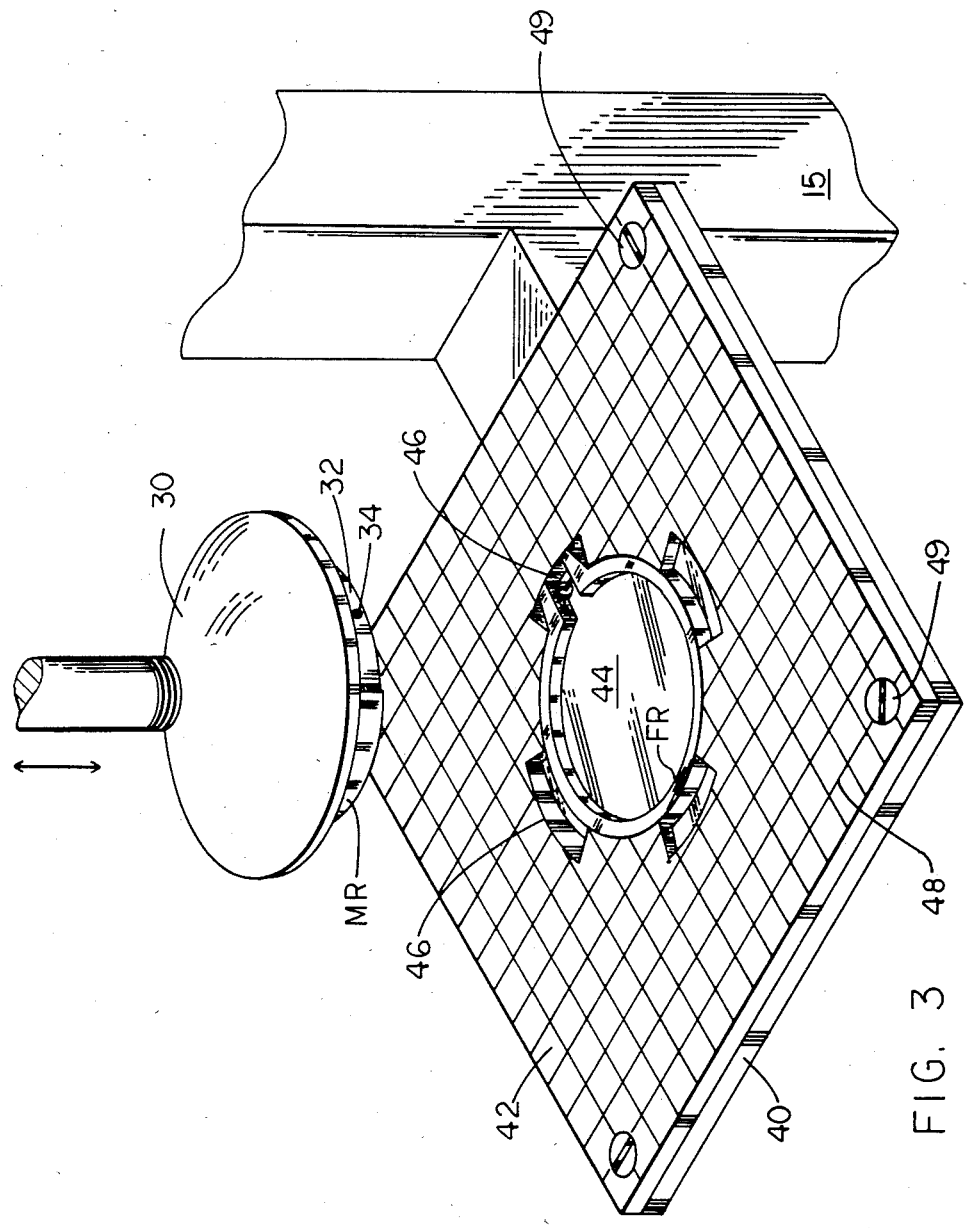
FIG. 3 is a detailed perspective view, with parts broken away, of the apparatus of FIG. 1.

Looking more closely at the individual components, the stationary support member 40 shown in FIGS. 1–3 includes an underlying support table 40 and an overlying template 42 connected to the vertical support 15 by an arm 60. The template 42 includes a cutout portion 44 into which the female ring FR of the embroidery hoop is placed. The ring FR can be aligned in a variety of positions dependent on the desired alignment of the pattern ultimately embroidered. The cutout 44 includes a plurality of spaced apart notches 46 for receiving the tensioning element T of the hoop. The tensioning element T is attached to ring FR to permit adjustments for thickness of the fabric or material between the rings.

The tension device T, emplaced in one of the notches 46, prevents rotation of ring FR and thus maintains the alignment of the ring. The template 42 also includes a grid pattern 48 printed thereon to assist with alignment of fabric over the ring FR. Additionally, the round shape of the cutout 44 may be varied to accomodate various shapes of embroidery hoops—such as ovals.

To vary size and/or shape of embroidery hoops, the template 42 is removed from the underlying template support table 40 and replaced with another template by removal of the screws 49 which hold the template on the support plate. Another means is to remove the plate 40 and template 42 as an entire unit and replace with another unit wherein the template cutout 44 is of an appropriate size and shape. The support plate 40 and template 42 are supported on arm 60 which is vertically adjustable on support structure 15. This vertical adjustment is utilized to compensate for excess pressure by the reciprocating head 30 on the table unit. The arm 60 is secured to a sleeve 62 that surrounds the support 15, sliding up and down thereon. Compression screws 64 hold the sleeve 62 in the selected position.

Figure 4:
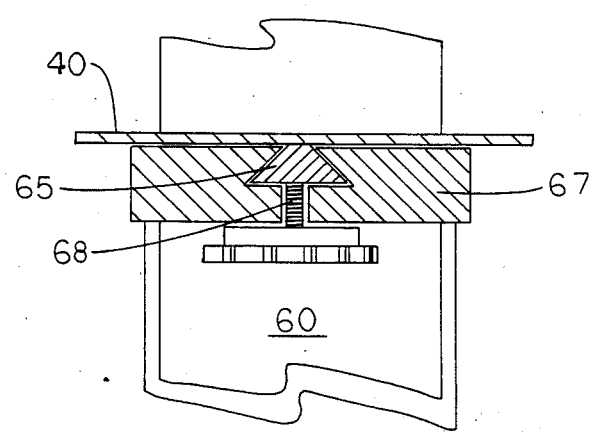
FIG. 4 is a plan view of the means for mounting the removable support table and template on the structural frame.

The table unit 40 is attached to the arm 60 by means of interrelating dovetail components 65, 67 (FIG. 4). The arm 60 includes a male dovetail unit 65 that slides into a female unit 67 on the underside of table unit 43. Screws 68 hold the dovetail components 65, 67 together and are loosened to remove the table unit.

The operation of the reciprocating head 30 is best illustrated in FIG. 2 where the lever mechanism is detailed. The head itself is detailed in FIG. 3. The head 30 includes a ring retaining portion 32 which receives the male ring MR and retains the ring thereon by friction. To improve the frictional capabilities of the retainer 32, nylon screws 34 are mounted around the circumference of the retainer 32 in a well known, conventional manner. The screws press against the inner surface of the male ring to improve the frictional engagement of the ring against the retainer 32. This type of retainer is well known and is not, in and of itself, thought to be a critical aspect of the invention. As shown in FIG. 3 the male ring MR is placed on the retainer 32 for insertion into the female ring after the material has been aligned thereover. The head 30 reciprocates vertically by means of the lever mechanism 76, 74, 70 linking the head to the control pedal 50.

The linkage mechanism shown in FIG. 2 comprises a support rod 70 on which the head 30 is threadedly mounted. The rod 70 includes a threaded end portion 72 which connects to correspondingly threaded passageway 36 in the head 30. The support rod 70 is guided in its vertical path by virtue of being mounted in guide bearings 80, which in turn are secured to the upper bracket 19. Rod 70 is connected to one end of a first lever arm 74 at a first pivot point $P_1$. Lever arm 74 is pivotally connected to the upper end of a vertical connecting rod 76 at a second pivot $P_2$ about a fulcrum $P_4$. Connecting rod 76 is operatively connected at its lower end to a second lever arm 52 at a third pivot point, $P_3$. Lever arm 52 operates about a fulcrum $P_5$ and terminates in pedal 50.

In operation, depression of pedal 50 pushes rod 76 upwardly at pivot $P_3$. Rod 76 moving upwardly raises the right hand end of lever arm 74 at pivot $P_2$, which in turn lowers the left hand end of lever arm 74 causing support rod 70 and head 30 to reciprocate downwardly. Release of pedal 50 causes an opposite action, lifting head 30 to its normal, upward position.

The lever arm 74 operates about the stationary fulcrum $P_4$. The support rod 70 is stabilized in its motion by retaining/guide rings 80 as described hereinabove. The primary structure and frame are preferably formed from metallic materials such as sheet metal, cast aluminum, etc. The head 30 is formed of metal or heavy, rigid molded polymeric materials.

As mentioned above, the head 30 is attached to rod 70 by a threaded connection so that the heads can be changed as necessitated by changing size or shape of embroidery hoops. Thus the diameter of the ring MR retaining member 32 can be varied, as can the shape—round, oval, etc.—by removing one head and replacing with another.

In operation, the female ring FR is placed in the appropriate template on supporting table 40. The male MR is placed around the retaining means 32. Fabric, leather or other material to be embroidered is positioned across the female ring, using the grid 48 as a guide. The material is held in alignment by the operator, and the foot pedal 50 is depressed to lower the reciprocating head 30. When the head is lowered, the male ring is inserted into the female ring. The compression of the ring MR within the female ring overcomes the frictional retention of the ring MR on retaining means 32, and the male is captured therein. Release of the pedal 50 raises the reciprocating head 30, the framed hoop is removed, and empty rings are positioned to receive fabric in a subsequent procedure.

It is therefore shown that a unique and efficient mechanism for framing embroidery hoops has been developed. It should be pointed out that the present invention resides in the mechanical retention of the female ring and either (and preferably) the mechanical retention and activation of the male member while manually positioning the fabric, or alternatively the mechanical retention of the fabric while the male ring is manually emplaced. Other and further modifications may be made without departing from the scope of the claims below.

What is claimed is:

1. Apparatus for framing sheets of textile fabric or flexible material between mating inner male and outer female rings of an embroidery hoop in preparation for an embroidering operation to be performed on the fabric or material, said apparatus comprising:
   (a) a planar support member having receiving means associated therewith for removably positioning and retaining one of said outer, female rings of said embroidery hoop thereon in a receiving position in which said one female ring is arranged at a prescribed orientation;
   (b) insertion means for releasably receiving and retaining said male ring thereon;
   (c) said insertion means being aligned with said receiving means and being movable between a first position in which said insertion means is retracted from said receiving means and a second position in which said insertion means is extended into an emplacement position where said male ring is moved into frictional engagement with said female ring with said material therebetween;
   (d) activating means for urging said insertion means between said first and second positions;
   (e) a substantially vertical support frame, with said planar support member being stationarily, but adjustably mounted on said support frame at an intermediate position; said insertion means being movably mounted on said support frame at an upper position above said planar support member; and said activating means being carried by said support frame, said activating means comprising a reciprocating linkage connected at one end to said insertion means and at the other end to an operative foot pedal;

whereby, after said female ring is positioned on said planar support member, and a sheet of fabric or material has been stretched thereacross, said reciprocating means is activated by said foot pedal to reciprocate said insertion means downwardly to insert said male ring.

2. Apparatus according to claim 1 wherein said planar support member comprises:
  (a) a table formed of a sheet of rigid material;
  (b) a template including a cutout therein having a size and shape substantially the same in size and shape as the outer dimensions of said female ring; said template being secured in a contiguous, overlying position to said table and including guide indicia thereon for facilitating proper emplacement of the fabric;

whereby, said female ring is positioned in said template prior to alignment of material thereover.

3. Apparatus according to claim 1 wherein said insertion means comprises:
  (a) a head member having a ring retaining portion depending downwardly therefrom for receiving said male ring thereon; said ring retaining portion having an outer diameter substantially equal to or slightly less than the inner diameter of said male ring and attachment means associated therewith for frictionally retaining said male ring thereon;
  (b) said head member being connected to said reciprocating linkage at the end of said head member opposite said attachment means for vertical reciprocal movement.

4. Apparatus according to claim 3 wherein said attachement means includes a plurality of screws mounted in spaced-apart relationship around said ring retaining portion, said screws extending a prescribed distance outwardly from the circumference of said circular retaining portion such that as said male ring is slipped thereover said screws are biased against the inner surface of said ring.

5. Apparatus according to claim 3 wherein said head member further includes means for varying the shape and size of said ring retaining portion responsive to variations in size and shape of the embroidery hoops.

6. Apparatus according to claim 3 wherein said head further includes a connecting means for releasably attaching said head to said reciprocating linkage for vertical movement.

7. Apparatus according to claim 6 wherein said connecting means comprises a support rod attached to and extending upwardly from said head, the upper end of said support rod being attached to said one end of said reciprocating linkage.

8. Apparatus for framing sheets of textile fabric or flexible material between mating inner male and outer female rings of an embroidery hoop in preparation for an embroidering operation to be performed on the fabric or material, said apparatus comprising:
  (a) a planar support member having receiving means associated therewith for removably positioning and retaining one of said outer, female rings of said embroidery hoop thereon in a receiving position in which said one female ring is arranged at a prescribed orientation; said planar support member comprising a table formed of a sheet of rigid material and a template including a cut-out therein having a size and shape substantially the same in size and shape as the outer dimensions of said female ring; said template being secured in a contiguous, overlying position to said table and including guide indicia thereon for facilitating proper emplacement of the fabric;
  (b) insertion means for releasably receiving and retaining said male ring thereon;
  (c) said insertion means being aligned with said receiving means and being movable between a first position in which said insertion means is retracted from said receiving means and a second position in which said insertion means is extended into an emplacement position where said male ring is moved into frictional engagement with said female ring with said material therebetween;
  (d) activating means for urging said insertion means between said first and second positions;
  (e) a substantially vertical support frame, with said planar support member being stationarily, but adjustably mounted on said support frame at an intermediate position; said insertion means being movably mounted on said support frame at an upper position above said planar support member; and said activating means being carried by said support frame;
  (f) said activating means including a support rod for receiving and supporting said insertion means above said planar support member;
    (i) a vertically extending connecting rod carried by said vertical support frame for linking said control means to said support rod;
    (ii) a first lever means pivotally connecting said support rod and said connecting rod such that vertical movement of said connecting rod is imparted to said support rod;
    (iii) a second lever means connecting said connecting rod and said foot pedal such that activation of said foot pedal effects a vertical movement of said connecting rod;

whereby, activation of said foot pedal effects an upwardly vertical movement of said connecting rod and a corresponding downwardly vertical movement of said support rod to insert said male ring into said female ring, and release of said foot pedal effects a resulting downward movement of said connecting rod and withdrawal of said support rod to its first upper position.

* * * * *